May 29, 1923.

J. O. WILSON

1,456,957

PERMUTATION LOCK

Filed May 12, 1921

INVENTOR
JAMES O. WILSON.

BY
E. W. Marshall
ATTORNEY

J. O. WILSON

PERMUTATION LOCK

Filed May 12, 1921

INVENTOR
JAMES O. WILSON.
BY
E. W. Marshall
ATTORNEY

May 29, 1923.

J. O. WILSON

PERMUTATION LOCK

Filed May 12, 1921

INVENTOR
JAMES O. WILSON.
BY
*E. W. Marshall*
ATTORNEY

Patented May 29, 1923.

1,456,957

UNITED STATES PATENT OFFICE.

JAMES O. WILSON, OF JERSEY CITY, NEW JERSEY.

PERMUTATION LOCK.

Application filed May 12, 1921. Serial No. 468,839.

*To all whom it may concern:*

Be it known that I, JAMES O. WILSON, a citizen of the United States, and a resident of Jersey City, Hudson County, and State of New Jersey, have invented certain new and useful Improvements in Permutation Locks, of which the following is a specification.

This invention is in the nature of an improvement on the lock disclosed in my pending application Serial No. 419,619, in which it has been my purpose to simplify and reduce the cost of the lock mechanism.

Other objects have been to condense and make the lock more compact and to facilitate assemblage and disassemblage of the same.

In the accompanying drawings I have illustrated a simple and practical form of a lock as applied to the securing of a file cabinet but wish it understood that the structure may be modified and be applied to other purposes without departure from the true spirit and scope of the invention.

In the cabinet shown the three drawers 25 are locked by a slide 26 at the back of the cabinet and having hooked engagement at 27 with the inner ends of the drawers. This vertical locking slide is connected with a bell crank 28 which in turn is operated by a push rod 29 having a thumb button 30 projecting from the front of the case. The construction thus far described is common to apparatus now in use.

The permutation lock mechanism controls operation of the push rod 29 through the medium of a dogging lever 31 pivoted on the push rod at 32 and forced outwardly or away from the top of the cabinet by a spring 33 engaging at one end beneath an outstanding flange or shelf 34 on the free end of said lever. This flange or shelf 34 constitutes an elongated bearing for engagement by the projecting arm 35 of a lever 36 pivoted on the bearing rod 37 of the lock structure. The free end of the lever 31 is notched as I have indicated at 38 to fit the edge of an abutment or locking flange 39 extended inward from the front of the casing. A tension spring 40 draws the push rod 29 outwardly so as to hold this notched end of the lever firmly engaged with the locking flange 39.

Figure 3:
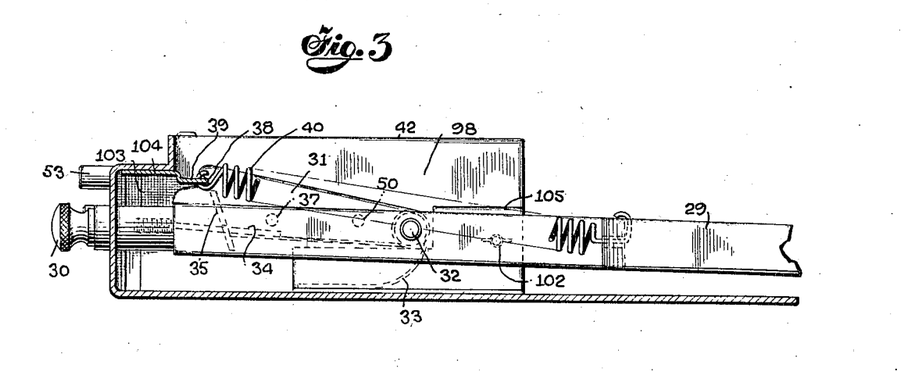
Fig. 3 is a broken sectional view as taken on substantially the plane of line 3—3 of Fig. 2.
Figure 5:
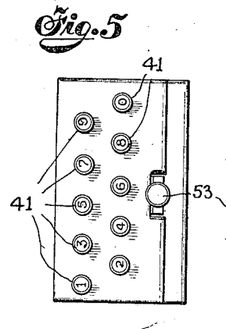
Fig. 5 is an end view of the lock showing particularly the actuating and restoring keys.

The tumblers of the permutation mechanism are set by operating, in their proper order, a series of push buttons 41, there being ten of these in the illustration (Fig. 5) and numbered 1–9 and 0. When these tumblers are properly set a spring 42 connected at one end with the top or cover 43 of the lock (Fig. 7) and at its opposite end with an arm 44 on the slide 45, can operate to shift said slide longitudinally from the position shown in Fig. 7 to the position shown in Fig. 11 and this slide is connected with the lever 36 (Fig. 6) by means of an outstanding lug 46 engaging in a slot 47 in the upper edge of the lever so as to rock said lever in a direction to release the lever 31 from holding engagement with the locking flange 39. Consequently after setting the lock to the proper combination the slide rod 29 will operate to unlock the drawers by simply pushing in the handle 30 of said rod until the notch 38 will disengage from the locking flange 39, whereupon the locking lever will be depressed into the dotted position shown in Fig. 3 so as to permit the spring 40 to assert itself and throw the push rod outward.

With this preliminary view of the action we will turn to consideration of the actual structure of the lock.

Figure 4:
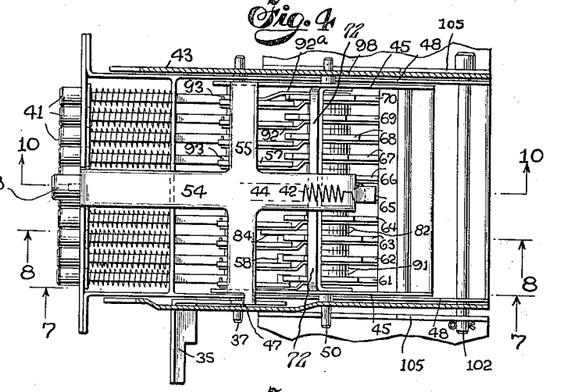
Fig. 4 is a sectional view of the lock proper as taken on substantially the line 4—4 of Fig. 6.
Figure 6:
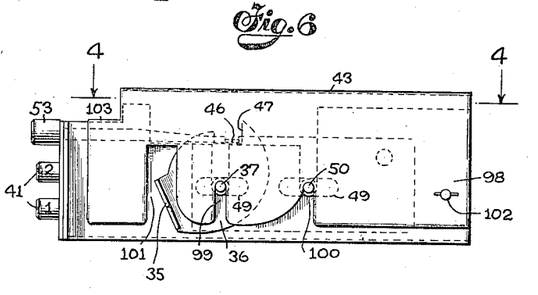
Fig. 6 is a side view of the lock.

The locking slide 45 is shown constructed as a parallel sided frame slidingly guided between the side walls 48 of the lock case and having longitudinal slots 49 therein by which it is guided over the lever supporting shaft 37 and the tumbler shaft 50 (Fig. 6). This slide carries at its rearward or inner end a transverse bar 51 constituting the so-called "gate" for cooperation with the slots in the tumblers and carries also a transverse restoring bar 52 for restoring the tumblers to their predetermined initial relation. Also forming a part of and attached to this slide is a push button 53 by which the slide may be retracted, said push button being shown as carried by a shank 54 connected with a cross-bar 55 extending across between the sides of the slide. The spring anchorage arm 44 is shown in Fig. 4 as connected with this same cross bar.

The combination setting push buttons 41 operate on levers journaled on the shaft 37, which levers are directly connected with the tumblers on the shaft 50.

Figure 7:
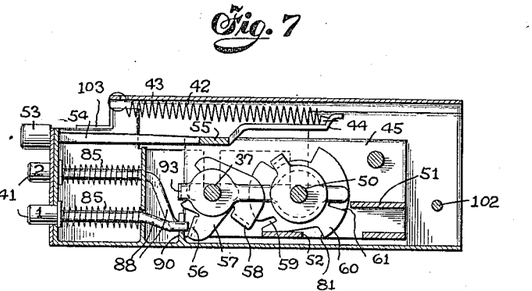
Fig. 7 is a longitudinal sectional view as taken on substantially the plane of line 7—7 of Fig. 4.

Thus push button No. 1 as shown in Fig. 7 engages at its inner end with an angularly turned lug 56 on the end of the lever 57 which has an inwardly turned lug 58 to mesh in a slot 59 in the first tumbler disc 60. This tumbler constitutes one of a number of so-called "idlers" which are interspersed with the so-called "master" tumblers on the tumbler shaft 50 and is provided with a slot 61 to receive the edge of the gate. Similarly the other tumbler discs 62, 63, 64, 65, 66, 67, 68, 69, 70 are provided with slots 61 to receive the gate or locking bolt 51.

In the lock illustrated the tumblers 64, 66, 63 and 69 are the master tumblers and the others are the idler tumblers.

These master tumblers are interlocked and interrelated so that they must be operated in a predetermined order to bring all the slots therein in line to effect the release of the locking bar.

Figures 8, 9, 16, 17, 18:
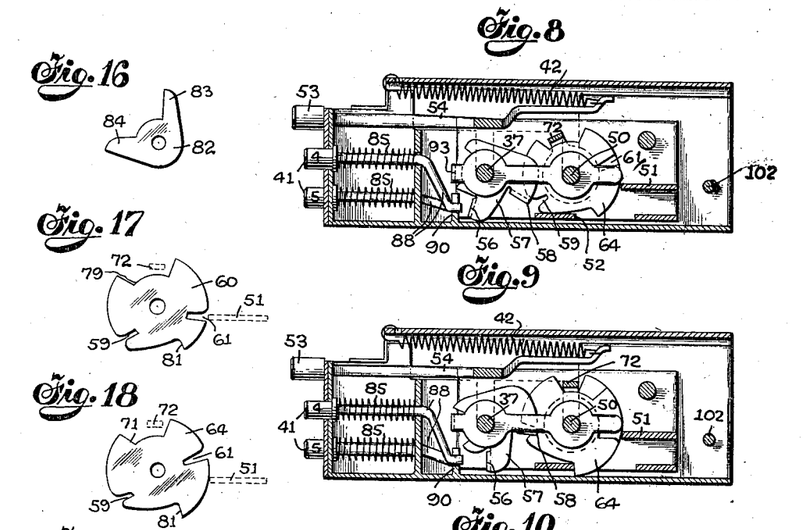
Figs. 8 and 9 are sectional views on substantially the plane of line 8—8 of Fig. 4 and showing the first master tumbler in the locking and the released positions.
Figs. 12 to 21 are detached detail views of various parts of the lock mechanism.
Figure 12:
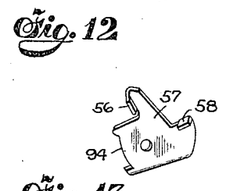

The actuating discs or levers which transmit the motion from the push buttons to the tumblers are all substantially alike and for that reason are all designated with the same reference character 57. One of these so-called "actuators" is shown in detail in Fig. 12, and similarly one of the idler tumblers, all of which are duplicates, is shown in Fig. 17.

The four master tumblers, which in this instance are actuated by the push buttons 4, 6, 3, 9, in the order named, are shown in detail in Figs. 18, 19, 20 and 21.

The first of these master tumblers (64, Fig. 18) that is the one which is actuated by the push button 4, in addition to notch 59 for the lug 58 of its actuating lever, is provided with a shoulder 71 which, in the rotation of this disc engages with a shift bar 72 which extends across the entire group of the tumblers as shown in Fig. 4 and serves, as it is turned by this first tumbler, to engage a shoulder 73 on the second master tumbler and rotate the second master to a point where the notch 59 therein will be in register with the lug 58 of the actuating lever therefor. Normally this second tumbler stands with the extra notch or recess 74 therein in line with the actuating lug so that the prior actuation of the first master tumbler is necessary to bring the second master tumbler into position for operation by its actuating lever.

Figures 10, 11, 19, 20, 21:
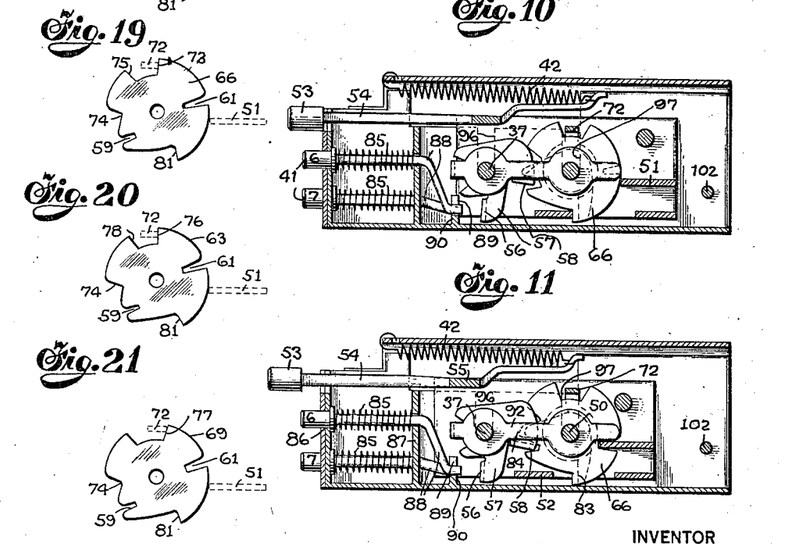
Figs. 10 and 11 are sectional views on substantially the plane of line 10—10 of Fig. 4 illustrating the operation of the second master tumbler.

The second master tumbler 66, as most clearly shown in Fig. 19, has another shoulder 75 opposite the first shoulder 73 and designed as this tumbler is rotated through actuation of the second master push button (#6) to carry along with it the shift bar 72 and cause the same to rotate the third master tumbler 63, by engagement with the shoulder 76 thereon. The actuation of the second master tumbler through the depression of push button #6 therefore serves to turn the third master tumbler from a position where the actuator therefor would operate idly in the enlarged notch 74 to a point where its actuator will mesh with the notch 59 therein. Hence when the third master push button #3 is depressed the actuator will be properly coupled with the tumbler, through engagement of the lug 58 in the notch 59, and this tumbler like the two preceding will be turned to bring the notch 61 therein into register with the gate or locking bar 51.

The third master tumbler 69 (Fig. 21) like the ones preceding is provided with a shoulder 77 adapted to be engaged by the shift bar 72 when that bar is advanced by engagement of the shoulder 78 on the third tumbler. Thus when the third master push button #3 is actuated not only is the third tumbler set to release the locking bolt or bar but the fourth tumbler is advanced and sufficiently to carry the idle notch 74 out of register with the actuating lug 58 and to bring the active notch 59 into position to be engaged by said lug. In other words the operation of this master tumbler in its proper order serves to advance the succeeding master tumbler to a point where it will be actively coupled to and actually operated by its actuator when this push button is depressed. This necessitates that these tumblers be actuated in a definite predetermined order.

The idler tumblers are provided with clearance notches 79 for the shift bar 72 and while these notches are wide enough to allow free action of the shift bar in the manner described, the shoulders at the ends of the same will, if the parts are not operated in this required order, engage and turn the shift bar so as to throw out the entire combination. This means that if one of the idler push buttons be operated before or between the operation of the master push buttons it will be impossible to then set the tumblers and release the lock.

Figures 13, 14, 15:
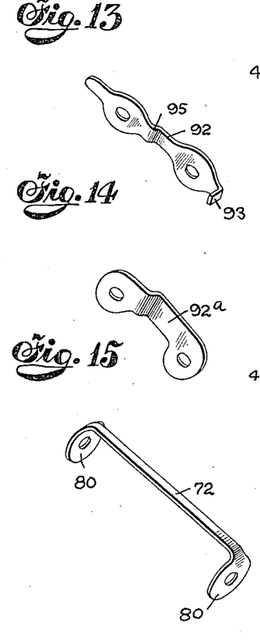

The shift bar is shown (Fig. 15) as made in yoke form having angled end portions 80 pivotally engaged on the tumbler shaft 50, these angular arms at the ends of the bar embracing the assembled tumblers and assisting in holding the same in closely assembled relation on the supporting shaft.

Before actuating the combination the tumblers are all restored to a predetermined initial position so as to line up the bolt receiving slots 61 in the idler tumblers and so as to place the master tumblers in their proper initial positions ready for the sequential operation described. This is accomplished by simply pressing in the push button 53 so as to bring the restoring or clearing bar 52 into engagement with the clearing shoulders 81 on the several tumblers. This action lines up all the idler tumblers ready to receive the bolt or bar 51 as indicated in Figs. 7 and 17 and positions the four master tumblers as shown in Figs. 8, 18, 19, 20 and 21 with the lock releasing slots therein out of register with the locking bolt.

Figure 1:
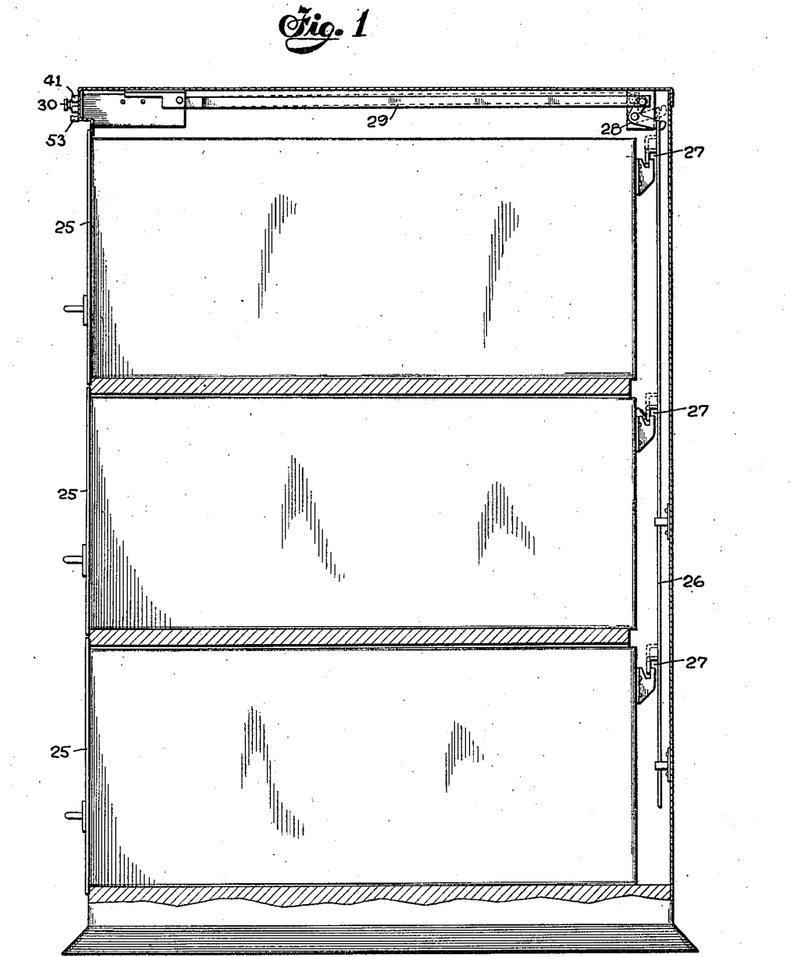
Fig. 1 in the drawings referred to is a broken vertical sectional view of a file cabinet equipped with the invention.
Figure 2:
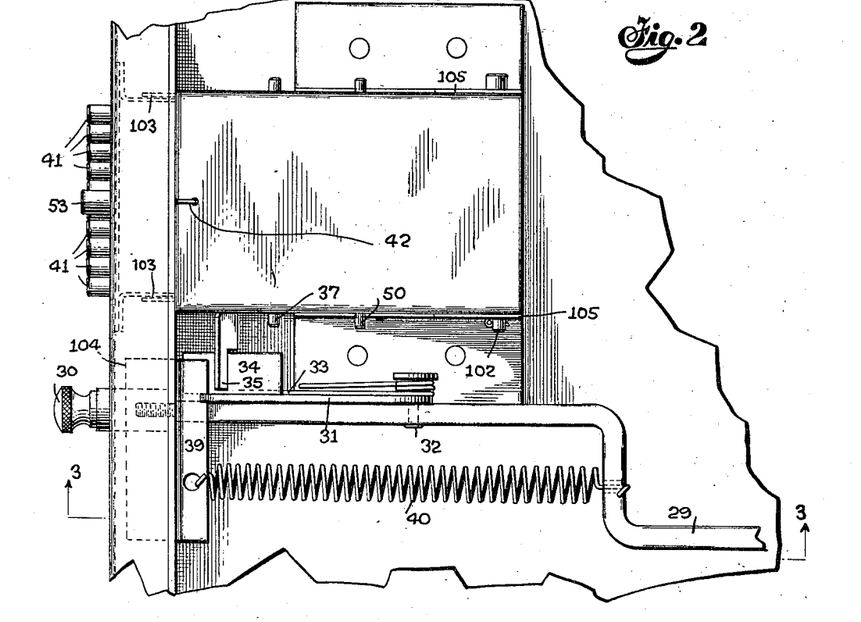
Fig. 2 is an enlarged plan view of the lock mechanism at the under side of the top of the cabinet.

With the parts thus set it is simply necessary to actuate the combination buttons 4, 6, 3, 9 in the order named so as to bring their lock releasing slots into register with the locking bar, it being evident that when all the slots are aligned the locking slide will be free to be shifted from the position shown in Fig. 10 to that shown in Fig. 11, under tension of the throwing spring 42, just as soon as the notch 38 in the dog 31 is released from the locking flange 39 (Figs. 2, 3) by pressure on the push button 30. In other words in this particular construction after the combination has been properly operated the mechanism is not actually released until the slide bar 29 is forced inward to clear the notch in the locking dog from the locking flange but when this last operation is effected the spring 42 shifts the slide to the left as in Fig. 11, turning the dog releasing lever 36 in a left handed direction (Fig. 6) and causing that to retract the dog from engagement with the locking flange whereupon the spring 40 then operates to project the slide bar 29 and lift the locking slide as indicated in the dotted lines in Fig. 1.

It will be noted that inasmuch as the idler tumblers have a simple lug and notch connection with their actuating levers, the restoration of these tumblers will automatically effect a return or restoration of the actuators therefor. The last three of the master tumblers, however, (66, 63 and 69) each have the additional or idle notch 74 which, if these tumblers have not been previously properly set, form clearances for the actuator lugs 58 allowing such actuators to swing freely without effecting any movement of the tumbler. Therefore to insure the restoration of these actuators I provide at the sides of these master tumblers 66, 63 and 69 the restoring dogs 82 (Figs. 10, 11 and 16) having angularly related arms 83, 84 to engage the clearing bar 52 and the actuator lugs 58 respectively. Thus it will be seen that when the slide is forced inward in the "clearing" action not only will all the tumblers be reset but the actuators for the last three master tumblers also will be turned back into position to be operated by their push buttons.

The combination setting push buttons are shown as pressed outwardly by springs 85 surrounding the shanks of the same which shanks or stems are slidingly guided in bearing openings provided in the front wall 86 and an inner partition wall 87 of the lock casing. I have shown the inner ends of these push button stems as bent angularly at 88 to bring the inner terminals of the same all in a single row in direct line with the bearing lugs 56 of the tumbler actuating discs or levers and to prevent turning of the push buttons, I have shown these angularly bent inner end portions as slidingly guided in the slots 89 in a rib or flange 90 on the inner wall of the casing.

The tumblers and their actuators may all be constructed of relatively light and inexpensive sheet metal and they may be spaced in proper relation on their respective supporting shafts 37 and 50 by suitable interposed spacing washers 91 also of sheet metal.

To maintain the supporting shafts 37, 50 in properly spaced relation during the assembling operation, I have shown links 92 of relatively light sheet metal (Figs. 7–11 and 13) perforated to slide over the shafts and having angularly turned lugs 93 at their outer ends to fit in notches 94 in the outer edges of the actuating levers and hence operate as stops to limit the throw of these levers. These links are shown as angled at 95 in their intermediate portions to offset the opposite ends of the same so that they will stand at the same side of the actuators and the tumblers related thereto, which as shown in Fig. 4, operate in overlapping relation, these links therefore serving to hold said actuators and tumblers in closely overlapping relation. At the end of the built up series of the actuators and tumblers I have shown a special link 92ᵃ (Figs. 4 and 14) which is like the others except that it is minus the stop lug 93.

After the tumblers and actuators are thus assembled and linked together within the sliding locking frame 45, said frame may be inserted within the lock case, the protruding ends of the shafts 37 and 50 passing into bearing slots 96, 97 provided therefor in the side walls of the case. The cover 42 is shown as having side walls or flanges 98 slotted at 99 and 100 to project over the reduced and shouldered end portions of the shafts 37 and 50 (Figs. 4 and 6) so as to hold these shafts against endwise displacement. One of these flanges (the lower one in Fig. 4) overstands the dog releasing lever 36 so as to hold the same in position on the end of the shaft 37 and is provided with a slot 101 to allow for free operation of the outstanding arm 35 of said lever. This cover is shown as secured at the rear by a rod 102 extending through the sides of the casing and the flanges 98 of the cover and at the front by the projecting shouldered portions 103 which, when the lock mechanism is inserted in the top of the cabinet, pass beneath a shoulder 104 provided at the front of the cabinet. The cover securing pin 102 also serves in the illustration to fasten the lock as a whole to the top of the casing by passing through the anchorage flanges 105 dependent from the top of the casing, which flanges further serve and operate to position the lock casing laterally so as to bring the push buttons into proper register with the openings provided therefor in the front walls of the casing.

It will be apparent that this improved lock is relatively simple and inexpensive and is adapted for use in many different connections. A special advantageous feature is that the parts, that is the tumblers, actuating discs, locking slide, etc., all interlock in their assembled relations in such a way that they are prevented from getting out of adjustment or out of their operative positions.

In view of the fact that the structure may be varied, for instance, to adapt the invention to different uses, I would have it understood that the terms which I have employed herein are used in a descriptive, rather than in a limiting sense, except, however, for such limitations as may be imposed by the prior art.

What I claim is:

1. In a lock of the character described, a series of concentrically arranged notched tumbler discs, a series of concentrically supported actuating discs for said tumbler discs, direct operating connections between certain of the actuating discs and tumbler discs, indirect connections between certain other actuating discs and tumbler discs and adapted to be rendered operative only by operation of the actuating and tumbler discs in a prearranged order, and a lock controlling bar adapted to enter the notches in the tumbler discs when the same are brought into pre-determined relation.

2. In a lock of the character described, a series of concentrically arranged notched tumbler discs, a series of concentrically supported actuating discs for said tumbler discs, direct operating connections between certain of the actuating discs and tumbler discs, indirect connections between certain other actuating discs, and tumbler discs and adapted to be rendered operative only by operation of the actuating and tumbler discs in a pre-arranged order, a lock controlling bar adapted to enter the notches in the tumbler discs when the same are brought into pre-determined relation, a slide supporting said lock controlling bar and means for restoring all of the discs to a pre-determined initial condition also carried by said slide.

3. In a lock of the character described, a series of concentrically arranged notched tumbler discs, a series of concentrically supported actuating discs for said tumbler discs, direct operating connections between certain of the actuating discs and tumbler discs, indirect connections between certain other actuating discs, and tumbler discs and adapted to be rendered operative only by operation of the actuating and tumbler discs in a pre-arranged order, a lock controlling bar adapted to enter the notches in the tumbler discs when the same are brought into pre-determined relation, a slide supporting said lock controlling bar and means for restoring all of the dics to a pre-determined initial condition also carried by said slide and including a clearing bar adapted for engagement with the tumbler discs.

4. In a lock of the character described, a series of concentrically arranged notched tumbler discs, a series of concentrically supported actuating discs for said tumbler discs, direct operating connections between certain of the actuating discs and tumbler discs, indirect connections between certain other actuating discs and tumbler discs and adapted to be rendered operative only by operation of the actuating and tumbler discs in a pre-arranged order, a lock controlling bar adapted to enter the notches in the tumbler discs when the same are brought into pre-determined relation, and push buttons having stems directly engaging the actuating discs.

5. In a lock of the character described, parallel supporting shafts, tumblers journaled on one of said shafts, actuating levers journaled on the other of said shafts, certain of said tumblers and levers having a constant intermeshing engagement whereby upon operation of such actuating levers the tumblers associated therewith will be always operated and certain other of the actuating levers and tumblers having intermeshing connections operative only upon actuation of the levers in a pre-determined order and a lock controlling member under control of the tumblers.

6. In a lock of the character described, parallel supporting shafts, tumblers journaled on one of said shafts, actuating levers journaled on the other of said shafts, certain of said tumblers and levers having a constant intermeshing engagement whereby upon operation of such actuating levers the tumblers associated therewith will be always operated and certain other of the actuating levers and tumblers having intermeshing connections operative only upon actuation of the levers in a pre-determined order and a lock controlling member under control of the tumblers, the connections referred to including a shifter journaled on the tumbler shaft and forming an operative connection between certain tumblers.

7. In a lock of the character described, parallel supporting shafts, tumblers journaled on one of said shafts, actuating levers journaled on the other of said shafts, certain of said tumblers and levers having a constant intermeshing engagement whereby upon operation of such actuating levers the tumblers associated therewith will be always operated and certain other of the actuating levers and tumblers having intermeshing connections operative only upon actuation of the levers in a pre-determined order and a lock controlling member under control of the tumblers, and links holding the tumbler and lever shafts in definite spaced relation.

8. In a lock of the character described, parallel supporting shafts, tumblers journaled on one of said shafts, actuating levers journaled on the other of said shafts, certain of said tumblers and levers having a constant intermeshing engagement whereby upon operation of such actuating levers the tumblers associated therewith will be always operated and certain other of the actuating levers and tumblers having intermeshing connections operative only upon actuation of the levers in a pre-determined order and a lock controlling member under control of the tumblers, and links holding the tumbler and lever shafts in definite spaced relation, said links having stop lugs limiting the motion of the actuating levers.

9. In a lock of the character disclosed, a lock controlling slide, a bar carried thereby, tumblers notched to receive said bar; actuating levers for said tumblers, direct connections between certain of the levers and tumblers, indirect connections between other of the levers and tumblers requiring operation of the levers in a pre-determined order and a clearing bar on the slide engaging the directly operated tumblers to turn them all to a position with the notches therein in line with the lock controlling bar and to turn the indirectly operated tumblers into position where they will turn with the notches therein in line with said bar when the actuating levers therefor are operated in the pre-arranged order.

10. In a lock of the character disclosed, a lock controlling slide, a bar carried thereby, tumblers notched to receive said bar, actuating levers for said tumblers, direct connections between certain of the levers and tumblers, indirect connections between other of the levers and tumblers requiring operation of the levers in a pre-determined order and a clearing bar on the slide engaging the directly operated tumblers to turn them all to a position with the notches therein in line with the lock controlling bar and to turn the indirectly operated tumblers into position where they will turn with the notches therein in line with said bar when the actuating levers therefor are operated in the pre-arranged order, and restoring dogs associated with the indirectly operated tumblers and actuated by the clearing bar to return the actuating levers for the indirectly operated tumblers to a pre-determined initial position.

11. Permutation lock mechanism comprising a series of tumblers, a slide normally restrained by said tumblers, means for operating the tumblers and adapted to cause the same to release the slide when certain selected tumblers have been operated and in a pre-determined order and a lever connected with the slide and adapting to control lock mechanism.

12. Permutation lock mechanism comprising a series of tumblers, a slide normally restrained by said tumblers, means for operating the tumblers and adapted to cause the same to release the slide when certain selected tumblers have been operated and in a pre-determined order and a lever connected with the slide and adapted to control lock mechanism, said lever having a lost motion connection with the slide.

13. In apparatus of the character disclosed, a locking lever, a spring tensioned member, connections from said spring tensioned member to the locking lever, tumblers controlling the spring tensioned member and actuating devices for the tumblers designed to effect the release of the spring tensioned member only when certain of said devices have been operated and in a definite pre-determined order.

14. Permutation lock mechanism comprising substantially parallel shafts, a slide guided on said shafts and provided with a lock bar, a set of tumblers on one of the shafts for engagement by said lock bar, a set of actuating levers for the tumblers on the other shaft, said levers having variable connections with the tumblers requiring operation of certain of the same in a pre-determined order to release the locking bar and operating devices for the actuating levers.

15. Permutation lock mechanism comprising substantially parallel shafts, a slide guided on said shafts and provided with a lock bar, a set of tumblers on one of the shafts for engagement by said lock bar, a set of actuating levers for the tumblers on the other shaft, said levers having variable connections with the tumblers requiring operation of certain of the same in a pre-determined order to release the locking bar and operating devices for the actuating levers including spring pressed push buttons directly engaging the various levers.

16. Permutation lock mechanism comprising substantially parallel shafts, a slide guided on said shaft and provided with a lock bar, a set of tumblers on one of the shafts for engagement by said lock bar, a set of actuating levers for the tumblers on the other shaft, said levers having variable connections with the tumblers requiring operation of certain of the same in a pre-determined order to release the locking bar and operating devices for the actuating levers, a lock operating lever supported on one of the shafts and operating connections from the slide to said lever.

17. Permutation lock mechanism comprising substantially parallel shafts, a slide guided on said shaft and provided with a lock bar, a set of tumblers on one of the shafts for engagement by said lock bar, a set of actuating levers for the tumblers on the other shaft, said levers having variable connections with the tumblers requiring operation of certain of the same in a pre-determined order to release the locking bar and operating devices for the actuating levers, a lock operating lever supported on one of the shafts, operating connections from the slide to said lever, and a locking dog provided with a bearing flange engaged by said lever.

18. Permutation lock mechanism comprising substantially parallel shafts, a slide guided on said shafts and provided with a lock bar, a set of tumblers on one of the shafts for engagement by said lock bar, a set of actuating levers for the tumblers on the other shaft, said levers having variable connections with the tumblers requiring operation of certain of the same in a pre-determined order to release the locking bar, operating devices for the actuating levers, a device for manually operating the slide and a clearing bar on the slide for setting the tumblers in a pre-determined initial relation.

19. In a lock of the character described, a locking bar, a set of concentrically supported rotatable tumblers provided with notches therein to receive the locking bar, a shift bar extending across the edges of the tumblers and supported concentric to the tumbler axis, means for independently operating the tumblers and shoulders on the tumblers engaging and engaged by the shift bar for causing certain of the tumblers to advance certain other tumblers.

20. In a lock of the character disclosed, a locking bar, a supporting shaft, tumblers journaled on said shaft and provided with notches to receive the locking bar, a shift bar extending across the edges on the tumblers and having angularly related ends pivoted on the shaft, the tumblers having spaced shoulders receiving between them said shift bar and means for independently operating various tumblers.

21. In a lock of the character disclosed, a locking bar, a supporting shaft, tumblers journaled on said shaft and provided with notches to receive the locking bar, a shift bar extending across the edges of the tumblers and having angularly related ends pivoted on the shaft, the tumblers having spaced shoulders receiving between them said shift bar and means for independently operating various tumblers, a spring operating to hold the locking bar against the tumblers, means for forcing said bar away from the tumblers and means operative in said latter movement to effect the restoration of the tumblers to a pre-determined relation.

22. In a lock of the character disclosed, a locking bar, a supporting shaft, tumblers journaled on said shaft and provided with notches to receive the locking bar, a shift bar extending across the edges of the tumblers and having angularly related ends pivoted on the shaft, the tumblers having spaced shoulders receiving between them said shift bar and means for independently operating various tumblers including actuating levers having connections with the tumblers rendered operative through the operation of the shift bar.

23. In a lock of the character disclosed a case having open slots in the side walls thereof, shafts seated in said slots, a cover having flanges slotted to fit over and hold the shafts in the first mentioned slots, a slide slotted to operate over said shafts within the case, tumblers on one of the shafts, a bar carried by the slide to co-operate with said tumblers and operating devices for the tumblers on the other shaft.

24. In a lock of the character disclosed, a case having open slots in the side walls thereof, shafts seated in said slots, a cover having flanges slotted to fit over and hold the shafts in the first mentioned slots, a slide slotted to operate over said shafts within the case, tumblers on one of the shafts, a bar carried by the slide to co-operate with said tumblers, operating devices for the tumblers, a lever engaged on one of the shafts and having connection with the slide, the flange of the cover overstanding said lever to retain the same in position on the shaft.

25. In a lock of the character disclosed, a case having open slots in the side walls thereof, shafts seated in said slots, a cover having flanges slotted to fit over and hold the shafts in the first mentioned slots, a slide slotted to operate over said shafts within the case, tumblers on one of the shafts, a bar carried by the slide to cooperate with said tumblers and operating devices for the tumblers on the other shaft, the shafts having reduced shouldered ends and the slots in the cover being of a size to fit said reduced shouldered ends to thereby retain the shafts against endwise displacement.

26. In a lock of the character disclosed, a case having open slots in the side walls thereof, shafts seated in said slots, a cover having flanges slotted to fit over and hold the shafts in the first mentioned slots, a slide slotted to operate over said shafts within the case, tumblers on one of the shafts, a bar carried by the slide to cooperate with said tumblers, operating devices for the tumblers on the other shaft, a rod extending through the dependent flanges of the cover and the side walls of the case, pivotally securing the cover in place, and means for securing the opposite end of the cover.

27. In a lock of the character disclosed, a case having open slots in the side walls thereof, shafts seated in said slots, a cover having flanges slotted to fit over and hold the shafts in the first mentioned slots, a slide slotted to operate over said shafts within the case, tumblers on one of the shafts, a bar carried by the slide to cooperate with said tumblers, operating devices for the tumblers on the other shaft, a rod extending through the dependent flanges of the cover and the side walls of the case, pivotally securing the cover in place, and means for securing the opposite end of the cover including a supporting structure having a shoulder engaging the free end of the cover and said supporting structure further having flanges through which the pivot rod extends.

28. In a lock of the character disclosed, a set of push buttons, tumbler actuating levers operated thereby, a set of tumblers, connections from the actuating levers to the tumblers operative only on the actuation of the levers in a pre-determined order, a member controlled by the tumblers, means for restoring the tumblers to pre-determined relation and push buttons for actuating said restoring means arranged adjacent to the set of tumbler operating push buttons.

29. In a lock of the character disclosed, a lock case push buttons at one end of said case, actuating levers supported in the case in position to be operated by said push buttons, tumblers supported in the case operable by the levers upon actuation of the same only in a pre-determined order, a slide supported in the case and provided with a bar to cooperate with the tumblers.

30. In a device of the character disclosed, a spring operated movable member, a spring pressed dog pivoted on said member and having a notch in the end thereof, a relatively stationary locking shoulder positioned to fit in said notch and to thereby hold the dog against releasing movement therefrom, a spring actuated member having a sliding connection with the dog and permutation lock mechanism controlling operation of said last mentioned spring actuated member.

In witness whereof, I have hereunto set my hand this 9th day of May, 1921.

JAMES O. WILSON.